(12) United States Patent
Michel

(10) Patent No.: US 7,784,800 B2
(45) Date of Patent: Aug. 31, 2010

(54) HEIGHT ADJUSTMENT ON A WHEEL SUSPENSION FOR MOTOR VEHICLES

(75) Inventor: Wifried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 12/326,967

(22) Filed: Dec. 3, 2008

(65) Prior Publication Data

US 2009/0146385 A1 Jun. 11, 2009

(51) Int. Cl.
*B60G 17/00* (2006.01)
*B60G 13/08* (2006.01)

(52) U.S. Cl. ............... 280/5.514; 267/175; 267/221

(58) Field of Classification Search ......... 280/5.514, 280/5.515, 5.519, 43, 43.17, 6.15, 6.157; 267/175, 177, 221
See application file for complete search history.

(56) References Cited

U.S. PATENT DOCUMENTS

| 4,973,078 | A | 11/1990 | Barthelemy et al. |
| 5,539,639 | A | 7/1996 | Devaud et al. |
| 5,961,106 | A | 10/1999 | Shaffer |
| 6,857,625 | B2 * | 2/2005 | Loser et al. ............... 267/175 |
| 7,469,910 | B2 * | 12/2008 | Munster et al. ......... 280/5.514 |
| 2004/0036206 | A1 * | 2/2004 | Loser et al. ............... 267/218 |
| 2006/0163787 | A1 * | 7/2006 | Munster et al. ........... 267/221 |
| 2006/0163863 | A1 * | 7/2006 | Ellmann et al. ........... 280/788 |

FOREIGN PATENT DOCUMENTS

| DE | 1241717 | B | 1/1967 |
| DE | 3223195 | A1 | 12/1983 |
| DE | 3502579 | A1 | 7/1986 |
| DE | 4136262 | A1 | 5/1993 |
| DE | 19923343 | A1 | 11/2000 |
| DE | 19935865 | A1 | 2/2001 |
| DE | 19955410 | A1 | 5/2001 |
| DE | 100 09 213 | C2 | 9/2001 |
| DE | 10227417 | A1 | 2/2004 |
| DE | 10250805 | A1 | 5/2004 |
| DE | 10227416 | A1 | 8/2004 |
| EP | 1953013 | A | 8/2008 |
| FR | 2436682 | | 4/1980 |
| FR | 2695875 | A | 3/1994 |
| FR | 2803250 | A | 7/2001 |
| GB | 2338689 | A | 12/1999 |
| JP | 11108100 | A | 4/1999 |
| JP | 2001080336 | A | 3/2001 |
| WO | WO 2006131343 | A | 12/2006 |

OTHER PUBLICATIONS

Translation of JP 11-108100.*

* cited by examiner

*Primary Examiner*—Paul N Dickson
*Assistant Examiner*—Joseph Rocca
(74) *Attorney, Agent, or Firm*—Novak Druce + Quigg LLP

(57) ABSTRACT

A height adjustment on a wheel suspension for motor vehicles, having a shock absorber which has a piston rod, which shock absorber is dynamically connected to the vehicle body, and to which shock absorber a helical spring is coaxially assigned which is clamped between two spring plates that can be changed in their active distance and that determine the spring deflection and rebound path relative to a normal level, the body-side end of the shock absorber being assigned a shock absorber cap which influences the free spring path "s" of the helical spring and which is made adjustable at the same time with the adjustable spring plate.

4 Claims, 2 Drawing Sheets

HEIGHT ADJUSTMENT ON A WHEEL SUSPENSION FOR MOTOR VEHICLES

The invention relates to a height adjustment on a wheel suspension for motor vehicles, having a piston of a shock absorber, which shock absorber is coupled to the vehicle body and to which shock absorber a helical spring is assigned which is clamped between two spring plates that can be changed in their active distance and that determine the deflection and rebound path relative to a normal level.

BACKGROUND OF THE INVENTION

Such a height adjustment, as shown, for example, by DE 35 02 579 A1, has a vertically adjustable strut that is formed from a shock absorber and a helical spring, and whose helical spring, which is clamped between two spring plates, can be adjusted by means of an adjustment device, which can be hydraulically activated in its free spring path proceeding from a normal level, by moving the upper spring plate that is attached to a cylindrical sleeve which lies coaxially to the shock absorber. The shock absorber is fixed with its piston on the body of the motor vehicle and on its outer cylindrical jacket bears the wheel-side, stationary spring plate.

Furthermore, DE 102 50 805 B4 shows an adjustable strut with its compression spring that acts in the impact direction and a hydraulic telescoping vibration damper that acts in the impact direction with a piston-cylinder assembly on which the compression spring is held by means of a spring receiver, and the length of the strut can be adjusted by moving the spring receiver on the piston-cylinder assembly in the impact direction. For this purpose, the piston-cylinder assembly has an outer thread and the spring receiver has an internal thread which engages herein so that the spring receiver can be moved by rotating the piston-cylinder assembly in its axial direction.

The known height adjustments which are variably adjustable between two end positions make possible a given defined deflection and rebound path for the existing helical spring out of the "normal level" position. The deflection path is limited by a stop buffer, the rebound path by the piston in the shock absorber. The size of these arrangements is limited by the narrow installation space in the motor vehicle. This causes conflicts of objectives for the design of this height adjustment, since the helical spring must not be too short; due to the danger of lifting of the helical spring of the spring plate in the rebounded state at the low level, a residual pretensioning force of approximately 500 N must, however, be present. The helical spring may also not exceed the allowable tensions at any operating point and may not be too long, that is, it can only have a limited number of turns, so that in the "high level" position and when completely deflected, the turns do not touch. Therefore, there must still be a relatively large turn clearance in exactly this position.

To be able to meet these requirements, according to the prior art the spring path of the helical spring is largely limited. For the critical case of "full deflection path at the high level" this compromise must be accepted since when the strut is set to the "high level," the vehicle may travel off road. In this travel state it is of course not desirable for the full deflection path to be available. But the disadvantage is that in the "normal level" and "low level" positions the spring path is limited by the same amount as in the "high level" position, so that spring path is definitively lost.

Here the object of the invention is to eliminate these disadvantages.

SUMMARY OF THE INVENTION

The execution according to the invention for axially changing the position both of the adjustable spring plate and also the shock absorber cap which limits the spring path of the helical spring enables an increase of the deflection and rebound paths of the assigned helical spring in each of the respective height adjustment positions of the strut relative to the normal level. This yields the following advantages: when the adjustable spring plate is adjusted by the same amount as that of the cap, the desired spring path limitation at the high level takes place, at the "normal level" the situation corresponds to the spring path as without level control and for the "low level," deflection takes place to a somewhat greater degree; this is not disruptive since the "low level" position is only used for freeway driving and for freeway driving allows low ground clearance. When set to the "normal level," the deflection path corresponds to that without level control. If there is a transition to the "high level" from here, the adjustable spring plate lags relative to the cap so that minimum spring path limitation takes place; the helical spring during deflection is compressed somewhat more strongly than at the "normal level." If there is a transition to the "low level," the adjustable spring plate lags relative to the cap, from which the desired earlier use of the helical spring takes place. This action mechanism can be predetermined by the appropriate choice of the thread pitches of the absorber cap that acts as a stop and that has been screwed onto the cylinder of the shock absorber, and the ball screw that is used as the actuating device for the adjustable plate, and are dynamically connected to one another. With the execution according to the invention, the level of a road vehicle is therefore adjusted by base point adjustment of the helical spring without the disadvantage of limiting the spring path.

The invention is described below using one embodiment of the height adjustment which is shown more or less schematically in a section in the figures.

DETAILED DESCRIPTION OF THE PREFERRED EMBODIMENT OF THE INVENTION

Figure 1:
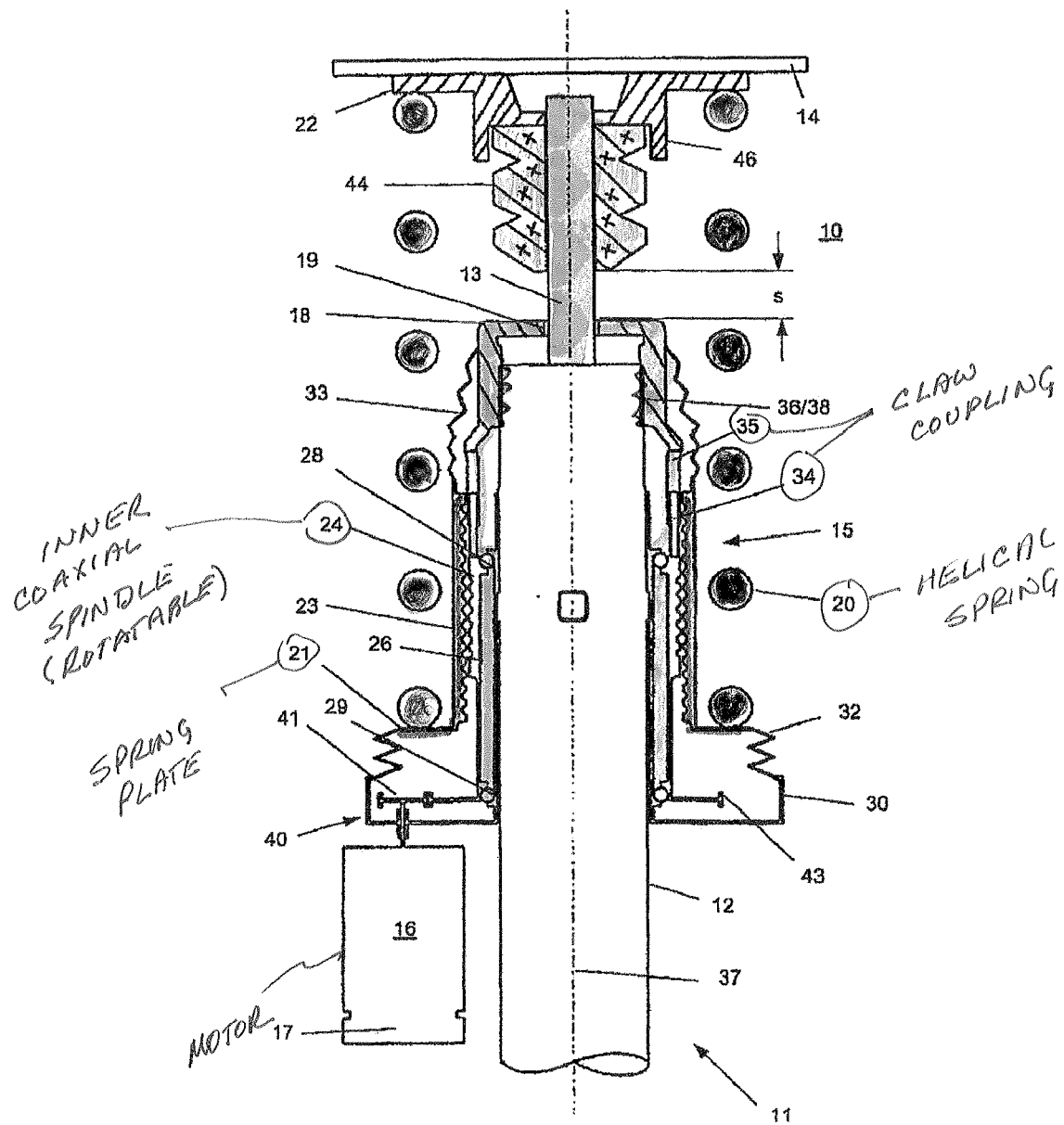
FIG. 1 shows the strut according to the invention and
FIG. 2 shows the spring path limitations of a strut which become necessary for the low, high and normal level.

As FIG. 1 shows, the height adjustment, which is designated as a whole as 10, comprises a shock absorber 11 with a cylinder 12 and a piston rod 13, a ball screw 15 which is located coaxially to the cylinder for the axial displacement of a spring plate 21 which is connected thereto, and a shock absorber cap 18 which is axially movably connected to the facing end side of the cylinder 12 by way of a threaded connection 36/38. By way of a motor drive 16 with a brake and shaft encoder 17 which are not detailed, the ball screw 15 and thus the spring plate 21 can be axially moved relative to the axis of symmetry 37 of the shock absorber. The schematically shown vehicle body is designated as 14.

The cap 18, which is made more or less cup-shaped in cross section and which is assigned to the cylinder 12, has a center opening 19 for the free passage of the piston rod 13. A coaxial helical spring 20, which with its upper turn rests on the bottom edge of a stationary spring plate 22 which is assigned to the body and with its lower turn rests on the adjustable spring plate 21, surrounds the shock absorber cylinder 12. The spring plate 21 is assigned to the ball screw 15 and is connected to the lower end side of the stationary nut part 23 of the ball screw 15, which part constitutes the cylinder sleeve. The ball screw 15 furthermore comprises an inner coaxial cylinder 24 which is designed as a rotatable spindle part; the facing sides of the nut and spindle part hold the balls of the ball screw in the corresponding recesses. The ball screw 15 is held stationary on the cylinder 12 by means of an actuator housing 26. The actuator housing for this purpose has bearing sites 28, 29 for the rotatable support of the spindle part 24 and bears a housing-like extension 30 on the end side. The ball screw 15 is sealed relative to external effects by way of gaskets 32, 33 which are coupled to the extension and to the nut part 23.

The rotatable spindle part 24, with its end side claw section which is made as a ring web 34, engages a ring slot 35 of the cap 18 which corresponds thereto, so that the ring web 34 and ring slot 35 form a claw coupling by way of which in the rotation of the ball screw 15 the cap 18 is likewise turned. Since it is screwed with the corresponding thread 38 on the cylinder 12 by way of the thread 36 which is located on its inside jacket surface, in its rotation it can likewise be axially moved relative to the axis 37 of symmetry. The thread of the cap 18 is therefore a female thread and the thread of the cylinder 12 is a male thread so that the cap 18 can be axially moved by a predetermined amount by the corresponding choice of the pitches of this thread.

The wheel-side end of the coaxial spindle part 24 is connected in a manner not detailed to the drive motor 16 which, by means of the pertinent toothed gearing 40, is used to adjust the adjustable spring plate 21 by way of the ball screw 15. This toothed gearing comprises a pinion 41 which engages the gear 43 which is connected on the lower end side of the spindle part 24 of the ball screw.

The piston rod 13 which projects with its free end through the center opening 19 of the cap 18 is surrounded by an elastomer stop buffer which is used as an additional spring 44 and which is held by the body-side spring plate 22 by means of the recess 46.

The distance "s" between the stop buffer (additional spring 44) and the facing end side of the cap 18 can be changed by way of the ball screw 15 and by way of the thread drive 36, 38 which is dynamically connected thereto (claw coupling 34).

In an adjustment process by way of the motor 16 and the gear connection 40, the spindle part 24 of the ball screw 15 which is pivotally held in the bearings 28, 29 is turned around the axis of symmetry 37 so that by way of the balls located in the ball races the nut part 23 of the ball screw and, with it, the lower spring plate 21 is changed in its axial position. At the same time, by way of the claw coupling 34, 35, the rotation of the spindle part 24 is transferred to the cap 18 which is changed axially in its position as a result of the threaded connection 36, 38 relative to the cylinder 12. Thus both the lower spring plate 21 and also the cap 18 are moved axially in their position to the extent of the selected thread pitches. With the adjustment of the adjustable spring plate therefore the distance "s" of the cap 18 to the additional spring 44 is simultaneously also changed axially to the extent predetermined at the time.

The pitch of the threaded connection between the cap 18 and the cylinder 12 in this case determines the axial adjustment path of the cap 18. By choosing the arrangement of the ball screw and the threaded connection 36, 38 between the cap and the cylinder, it is possible to adjust the cap 18 at the same time with the adjustable spring plate 21 and thus to change the free spring path for deflection and rebound of the helical spring 20. The pitch ratio of the ball screw and cap thread is generally 1:1. To achieve further effects of the relative movements of the absorber cap 18 and the adjustable spring plate 21, the pitch ratios of the ball screw and cap thread (36, 38) can also deviate from the ratio 1:1.

Figure 2:
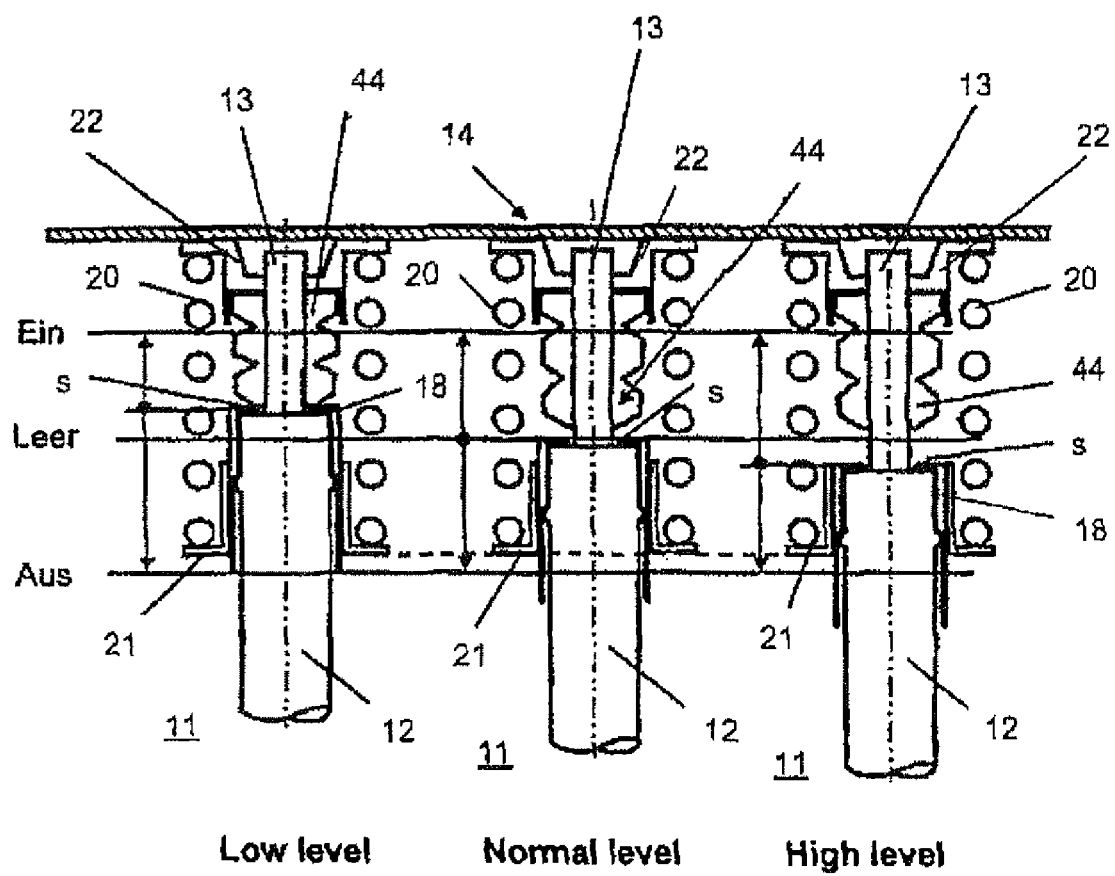

In this way, the initially explained problems of dimensioning of the spring paths for the deflection and rebound of the strut as shown in FIG. 2 for the positions low, normal, and high level of the pertinent vehicle can be solved, as shown in FIG. 1. Analogously to FIG. 1, the parts that correspond to one another in FIG. 2 are provided with the same reference numbers. FIG. 1 shows that stop forces in the upper stop—which is the spring plate 22—are delivered into the cap 18 by way of the stop buffer—the additional spring 44—and therefore under no circumstances act on the actual adjustment unit, that is, the sensitive ball screw 15. The adjustable cap 18 is supported directly on the shock absorber.

As FIG. 2 shows, the following operating situations arise:

a) Pitch threaded spindle adjustable spring plate=pitch absorber cap absorber cap is always moved by the same amount as the adjustable spring plate. The (desired) limitation of the spring path takes place at the high level, at the normal level the situation corresponds to the spring path as without level control, and at the low level wheel-referenced deflection is somewhat more; this is not disruptive since the low level is used only when driving on the freeway and there low ground clearance is allowed.

b) Pitch threaded spindle adjustable spring plate>pitch absorber cap normal level: normal deflection path as without level control; this is the basic design.

high level: absorber cap lags relative to the adjustable spring plate, resulting in minimum limitation of the spring path, the spring is somewhat more compressed during deflection than for the normal level.

low level: absorber cap lags relative to the adjustable spring plate, resulting in the desired earlier use of the additional spring at the low level.

c) pitch thread play adjustable spring plate<pitch absorber cap normal level: normal deflection path as without level control, corresponding to the basic design.

high level: absorber cap leads relative to the adjustable spring plate, resulting in somewhat greater limitation of the spring path than in case a), the spring is somewhat less compressed during deflection than for the normal level.

low level: absorber cap leads relative to the adjustable spring plate, resulting in later use of the additional spring at the low level.

Thus the required matching of the spring paths to the operating situations low, normal, and high level and thus the desired increase of the deflection and rebound paths of the helical spring in the respective height adjustment position of the wheel suspension relative to the normal level is achieved.

LIST OF REFERENCE NUMBERS

10 height adjustment
11 shock absorber
12 cylinder
13 piston rod
14 vehicle body
15 ball screw
16 drive motor 17 shaft encoder
18 cap (absorber cap)
19 center opening
20 coaxial helical spring
21 adjustable spring plate
22 fixed spring plate
23 nut part
24 coaxial spindle part
26 actuator housing
28 bearing site
29 bearing site
30 housing-like extension
32 gasket
33 gasket
34 ring web (claw section)
35 ring slot
36 internal thread (cap 18)
37 axis of symmetry
38 corresponding male thread
40 toothed gearing
41 drive pinion
43 gear
44 additional spring (stop buffer)
46 recess, spring plate 22

The invention claimed is:

1. A height adjustable strut for a motor vehicle, comprising:
a shock absorber including a cylinder connectable at a lower end thereof to a component of a wheel suspension system of said vehicle, a cap threaded on an upper end of said cylinder and a piston mounted on said cylinder having a rod extendable through an opening in said cap, provided with an elastomeric body connectable to the body of said vehicle;
a ball screw including a rotatable component coaxially mounted on said cylinder, an axially displaceable component cooperating with said rotatable component and means operatively interconnecting said rotatable component and said cap for transferring the rotary motion of said rotatable component to said cap;
means for selectively rotating said rotatable component; and
a spring disposed coaxially with said cylinder, interconnecting said axially displaceable component and said body of said vehicle.

2. A strut according to claim 1 wherein the ratio of the pitch of the threads of said cap to the pitch of the threads of said ball screw is 1:1.

3. A strut according to claim 1 wherein the ratio of the pitch of the threads of said cap to the pitch of the threads of said ball screw varies from 1:1.

4. A strut according to claim 1 wherein said axially displaceable component of said ball screw includes an annular surface disposed coaxially relative to said cylinder on which said spring is seated.

* * * * *